(12) United States Patent
Leach

(10) Patent No.: US 11,481,505 B2
(45) Date of Patent: Oct. 25, 2022

(54) PLATFORM SERVICES WITH CUSTOMER DATA ACCESS

(71) Applicant: Halliburton Energy Services, Inc., Houston, TX (US)

(72) Inventor: Nathan P. Leach, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 299 days.

(21) Appl. No.: 16/311,556

(22) PCT Filed: Aug. 24, 2016

(86) PCT No.: PCT/US2016/048383
§ 371 (c)(1),
(2) Date: Dec. 19, 2018

(87) PCT Pub. No.: WO2018/038719
PCT Pub. Date: Mar. 1, 2018

(65) Prior Publication Data
US 2019/0325152 A1    Oct. 24, 2019

(51) Int. Cl.
*G06F 21/62*    (2013.01)
*G06F 21/53*    (2013.01)
*G06Q 10/10*    (2012.01)
*G06Q 50/06*    (2012.01)

(52) U.S. Cl.
CPC .............. *G06F 21/62* (2013.01); *G06F 21/53* (2013.01); *G06Q 10/10* (2013.01); *G06Q 50/06* (2013.01); *G06F 2221/2149* (2013.01)

(58) Field of Classification Search
CPC .. G06F 21/62; G06F 21/53; G06F 2221/2149; G06Q 10/10; G06Q 50/06

USPC ........................................................... 726/30
See application file for complete search history.

(56) References Cited

U.S. PATENT DOCUMENTS

| | | | |
|---|---|---|---|
| 7,945,488 B2 * | 5/2011 | Karr ..................... | G06Q 10/087 705/28 |
| 8,706,800 B1 * | 4/2014 | Ahmed ................... | G06F 9/468 709/203 |
| 2007/0175633 A1 * | 8/2007 | Kosmala ............... | E21B 47/008 166/250.15 |

(Continued)

FOREIGN PATENT DOCUMENTS

WO    2018038719 A1    3/2018

OTHER PUBLICATIONS

NPL Search Terms (Year: 2021).*

(Continued)

*Primary Examiner* — Syed A Zaidi
(74) *Attorney, Agent, or Firm* — Tenley Krueger; Parker Justiss, P.C.

(57) ABSTRACT

A cloud computing platform, a method of operating a cloud computing platform, and a private business entity network are provided herein. In one embodiment, the cloud computing platform includes: (1) a consolidated data reservoir configured to store saved data collected by a business entity, (2) an application layer having an infrastructure for developing and running applications, including at least one customer application of a customer of the business entity, and (3) a service layer configured to control access of the customer application to the saved data and allow the customer application to execute proprietary algorithms of the business entity.

20 Claims, 5 Drawing Sheets

(56) References Cited

U.S. PATENT DOCUMENTS

| | | | |
|---|---|---|---|
| 2009/0259612 A1* | 10/2009 | Hanson | H04L 69/22 |
| | | | 706/47 |
| 2009/0319458 A1 | 12/2009 | Minka et al. | |
| 2013/0076525 A1* | 3/2013 | Vu | G05B 23/0272 |
| | | | 340/853.1 |
| 2013/0227563 A1* | 8/2013 | McGrath | G06F 8/60 |
| | | | 718/1 |
| 2014/0215590 A1* | 7/2014 | Brand | G06F 9/5072 |
| | | | 726/6 |
| 2014/0280193 A1* | 9/2014 | Cronin | G06N 20/00 |
| | | | 707/741 |
| 2015/0163206 A1* | 6/2015 | McCarthy | H04L 63/104 |
| | | | 726/4 |
| 2015/0341445 A1* | 11/2015 | Nikolov | G06F 9/5072 |
| | | | 709/203 |
| 2015/0347542 A1 | 12/2015 | Sullivan et al. | |
| 2016/0092632 A1 | 3/2016 | Zhou et al. | |
| 2016/0156707 A1 | 6/2016 | Manglik et al. | |
| 2016/0315917 A1* | 10/2016 | Smith | H04L 9/30 |

OTHER PUBLICATIONS

NPL Search Terms (Year: 2022).*

Zhong, Qi, et al. "Design on the platform system of well-site information center based on WITSML." International Industrial Informatics and Computer Engineering Conference (IIICEC 2015) (Year: 2015).*

* cited by examiner

PLATFORM SERVICES WITH CUSTOMER DATA ACCESS

CROSS-REFERENCE TO RELATED APPLICATION

This application is the National Stage of, and therefore claims the benefit of, International Application No. PCT/US2016/048383 filed on Aug. 24, 2016, entitled "PLATFORM SERVICES WITH CUSTOMER DATA ACCESS," which was published in English under International Publication Number WO 2018/038719 on Mar. 1, 2018. The above application is commonly assigned with this National Stage application and is incorporated herein by reference in its entirety.

BACKGROUND

Companies can generate and collect a significant amount of data related to the various jobs that they perform. The data can be related to the execution of various jobs performed by the companies. The data can also be financial data related to the overhead and profit of the various jobs. The companies can use the data for analysis and planning.

To process the data, companies may employ proprietary computer programs. As such, in addition to the data the companies can also have a significant amount of proprietary software implementing algorithms that aid them in planning, executing, and analyzing jobs.

BRIEF DESCRIPTION

Reference is now made to the following descriptions taken in conjunction with the accompanying drawings, in which.

DETAILED DESCRIPTION

Figure 1:
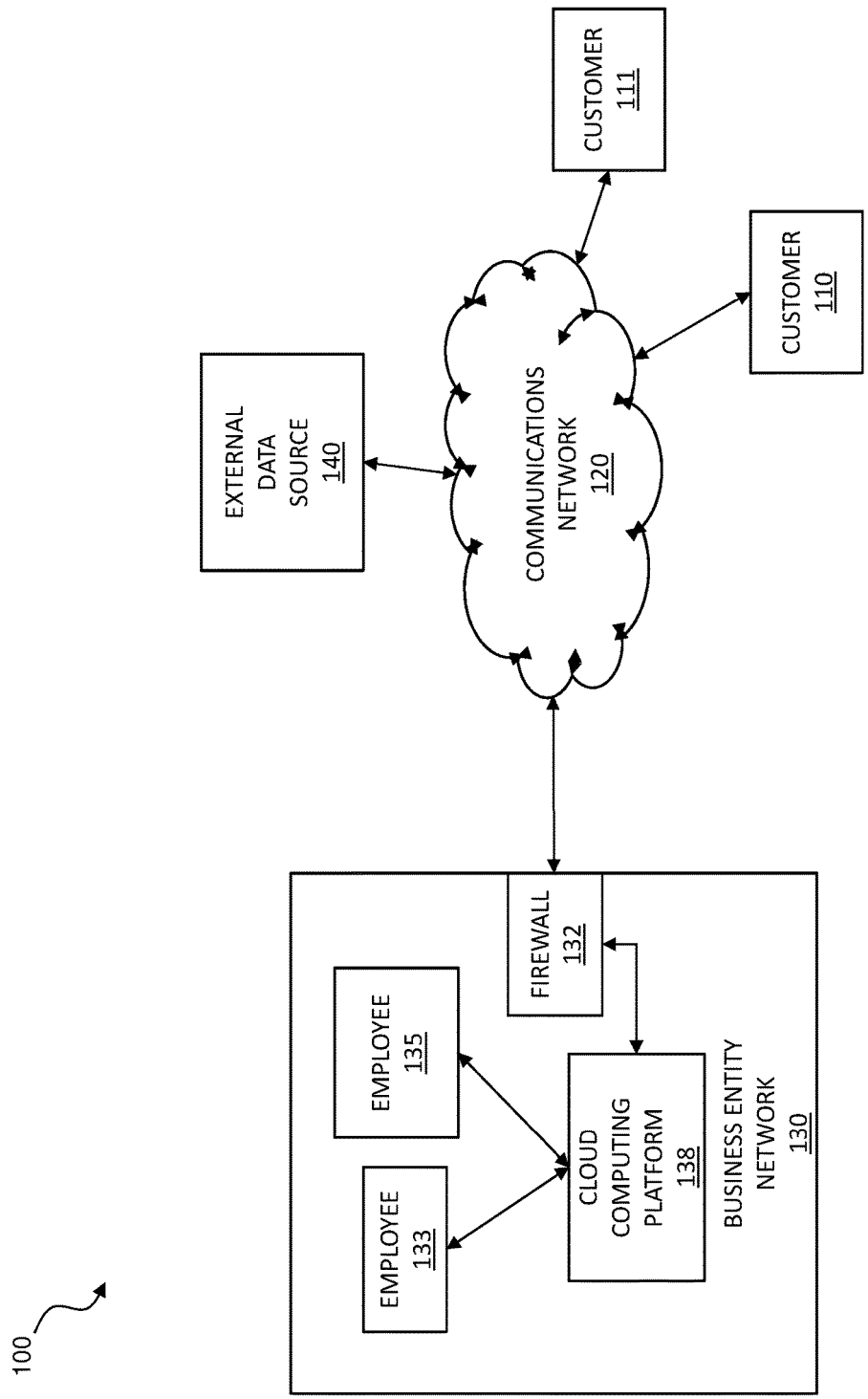
FIG. 1 illustrates a system diagram of a computer network that includes a cloud computing platform of a business entity.

Some of the data saved by a company can be associated with customers of the company. For example, the company may be a corporation that provides products and services to the energy industry. The corporation may collect data at a wellsite while performing a job for an energy customer. The collected data can be, for example, performance data of the tools, material data of the substrate or shell, physical data of the material, such as, viscosity, density, and physical phase, inventory data of the equipment or tools used at jobs, and financial information about the jobs.

Like the company, a customer may also find it beneficial to analyze the data collected by the company. A customer, however, may not have the sophisticated computer programs that are used to analyze the data and may not have the ability to develop such programs to analyze their data unless they have unrestricted access to that data. Additionally, a customer attempting to develop computer programs that are intended to run on a vendor's systems using traditional methods (desktop applications) is impractical and unsecure.

A customer may not also have sufficient computing power to process the amount of data saved by the company even if the customer had sophisticated computer programs. The scale of the data collected by the company may make it difficult for all but the largest customers to process in a way that yields any meaningful results. The large amount of data would potentially require customers to make a large investment in the computing resources needed to analyze data at such a scale. Lack of a large investment in computing resources put some customers at a disadvantage in terms of the speed in which they would be able to analyze their data even if they were given unrestricted access to a company's data related to jobs performed for the customer.

Customers may find it useful to have access to the proprietary software and advanced algorithms developed internally by a company that is not offered for sale to their customers. Since the advanced algorithms are often proprietary, a company often limits distribution to prevent theft. Thus, a customer often lacks the necessary computer programs, computing infrastructure, and data access to analyze their data collected by the company.

Accordingly, the disclosure provides a cloud computing platform that allows customers of a business entity to leverage the data, proprietary algorithms, and computing resources of the business entity. The cloud computing platform provides a platform where a customer's application can deploy and execute code as a self-service activity with well-defined security boundaries. The computer infrastructure of the disclosed cloud computing platform enables customers to develop and run their own computer applications or programs in, for example, a sandbox environment that allows the customer applications to execute the proprietary algorithms and access the data saved by the business entity employing the computing resources of the platform. The proprietary algorithms may be implemented as software.

A business entity is an entity engaged in business activities. A business entity is typically formed and administered according to commercial law and is often formed to sell a product or a service. There are many types of business entities that are defined by the legal systems of various countries. Different types of business entities are, for example, corporations, cooperatives, partnerships, and limited liability companies. Examples pertaining to a business entity in the energy industry are included herein.

A sandbox is a security mechanism that separates the operation of computer programs and controls access to resources, such as resources of the cloud computing platform. This security mechanism prevents access to lower-level computing resources, such as operating systems. The sandbox model allows the computing device on which a program is running to be hidden from the user. The computer infrastructure includes networks, servers, memory or data storage, operating systems, middleware, databases, and security programs or mechanisms.

In traditional platform systems, if any access is provided to client data and corporate proprietary algorithms, it is done as a limited set of services exposed to outside customers via inefficient communication protocols. For example, Platform as a Service (PaaS) systems typically provide a generic set of services that are merely generic tools for interfacing with data sets or services not provided native to the platform. This often introduces complexity and inefficiency in the applications running on the platform and is unsuitable for extremely large data sets.

The cloud computing platform described in this disclosure circumvents these problems by allowing customers to execute their applications using computing resources in close proximity to their own client data that the business entity has collected in the course of conducting business with or for the customer. The cloud computing platform disclosed herein includes proprietary algorithms and data access as part of the core set of platform services and gives abilities that are not provided by a conventional PaaS, such as a public cloud services provider. The need for software licensing and security is reduced as the algorithm code never leaves the business entity network. All execution takes place on business entity resources and the sandbox model prevents a customer from obtaining the code behind the platform services. The sandbox model can also restrict a customer to viewing data to which they have been granted access. For example, a customer cannot see data from other customers but could potentially see data from subsidiaries or companies with which they have a partnership agreement.

Unlike conventional approaches that allow customers access to their data via a reporting dashboard or a very limited set of activities which a customer can execute for their analysis, this disclosure provides a cloud computing platform where a customer can implement virtually any approach while a business entity is able to control the data to which they have access. Thus, the cloud computing platform allows a business entity to protect the data collected from one customer from being accessed by another customer. Accordingly, access to valuable intellectual property of a business entity, such as collected data and proprietary algorithms, is easier to provide to customers and protect from competitors.

FIG. 1 illustrates a system diagram of a computer network 100 that includes a cloud computing platform of a business entity. The computer network 100 includes customer computing devices, denoted in FIG. 1 as devices 110 and 111, a communications network 120, a business entity network 130, and an external data source 140. The computer network 100 may include additional components or devices that are not illustrated or discussed herein that are typically included in a computer network.

Each of the customer computing devices 110, 111, include at least a processor, a memory, a user interface, and communication hardware for connecting and communicating over a communications network, such as the Internet. The customer computing devices 110, 111, each represent a different customer of a business entity. Each customer can have multiple computing devices. Additionally, the business entity can include more customers than the two representative customers of FIG. 1. In FIG. 1, computing device 110 corresponds to Customer A and computing device 111 corresponds to Customer B. The customer computing devices 110, 111, can be conventional computers that are capable of communicating over the communications network 120.

The communications network 120 is a number of computers that are interconnected and communicate through a system of routers, servers, switches, etc. The communications network 120 can be wired, wireless or a combination thereof. The communications network 120 can be a conventional network that operates according to standard communication protocols. The communications network 120 may be the Internet. The customer computing devices 110, 111, communicate through the communications network 120 to the business entity network 130.

The business entity network 130 is a computer network specifically associated with the business entity. The business entity network 130 includes a firewall 132, business entity computing devices 133, 135, and a cloud computing platform 138. The business entity network 130 can be a private network of the business entity that is considered to be a trusted, secure network.

The firewall 132 is a security system that is configured to monitor and control incoming and outgoing communications network 120 traffic for the business entity network 130 based on predetermined security rules. The firewall 132 provides a barrier between the internal business entity network 130 that is a trusted, secure network of the business entity, and another outside network, such as the communications network 120, that is assumed to be unsecure. The firewall 132 can be a conventional firewall that is typically used with private computer networks.

The business entity computing devices denoted as employee 133, employee 135, in FIG. 1, include at least a processor, a memory, a user interface, and communication hardware for connecting and communicating over a communications network, such as the business entity network 130. The business entity computing devices 133, 135, each represent a different employee or person that is authorized to use the business entity network 130. The business entity network 130 can include more computing devices than the two illustrated devices, 133, 135. The business entity computing devices 133, 135, can be conventional computers that are capable of communicating over a computer network such as the business entity network 130. Unlike the customer computing devices 110, 111, the business entity computing devices 133, 135, can connect and communicate with the cloud computing platform 138 without using the communications network 120 and without going through the firewall 132.

The cloud computing platform 138 is a computer infrastructure that supports the development needs of the business entity and its customers. The cloud computing platform 138 can include an application platform, a consolidated data reservoir, and a security reservoir. The consolidated data reservoir is configured to store saved data collected or generated by the business entity. The application platform provides a computer infrastructure for customers of the business entity and the business entity itself to develop and run applications in isolation. The application platform also controls access of customer applications to the saved data and allows the customer applications to execute proprietary algorithms of the business entity. The security reservoir includes security and system configuration information that is used to control access to the resources of the cloud computing platform 138. The security reservoir can be controlled by an information technology team of the business entity and is part of limiting use of the cloud computing platform 138 to those parties that are authorized. More details of a cloud computing platform are discussed with respect to FIG. 2.

The external data source 140 is a source of data that is independent of the business entity. The external data source 140 can be a public data source. The cloud computing platform 138 is configured to store the external data in the consolidated data reservoir. The cloud computing platform 138 can receive the external data from the external data source 140 via the communications network 120. By virtue of the network connection, the customer applications can connect to the external data source 140 as part of their operation. As such, customer applications can access external data that is not stored on the cloud computing platform 138.

The external data source 140 can provide publicly available data, such as, well production numbers, land ownership, chemical reporting requirements, etc. Some of the external source data can be from competitors, such as the chemical reporting data that companies are required to file. The external data source 140 can be associated with the weather and include ACCUWEATHER®, INTELLICAST®, THE WEATHER CHANNEL®, the National Oceanic and Atmospheric Administration (NOAA) National Weather Service, and various local weather services proximate, for example, a location of interest to the business entity. The location of interest may be a well site.

Figure 2:
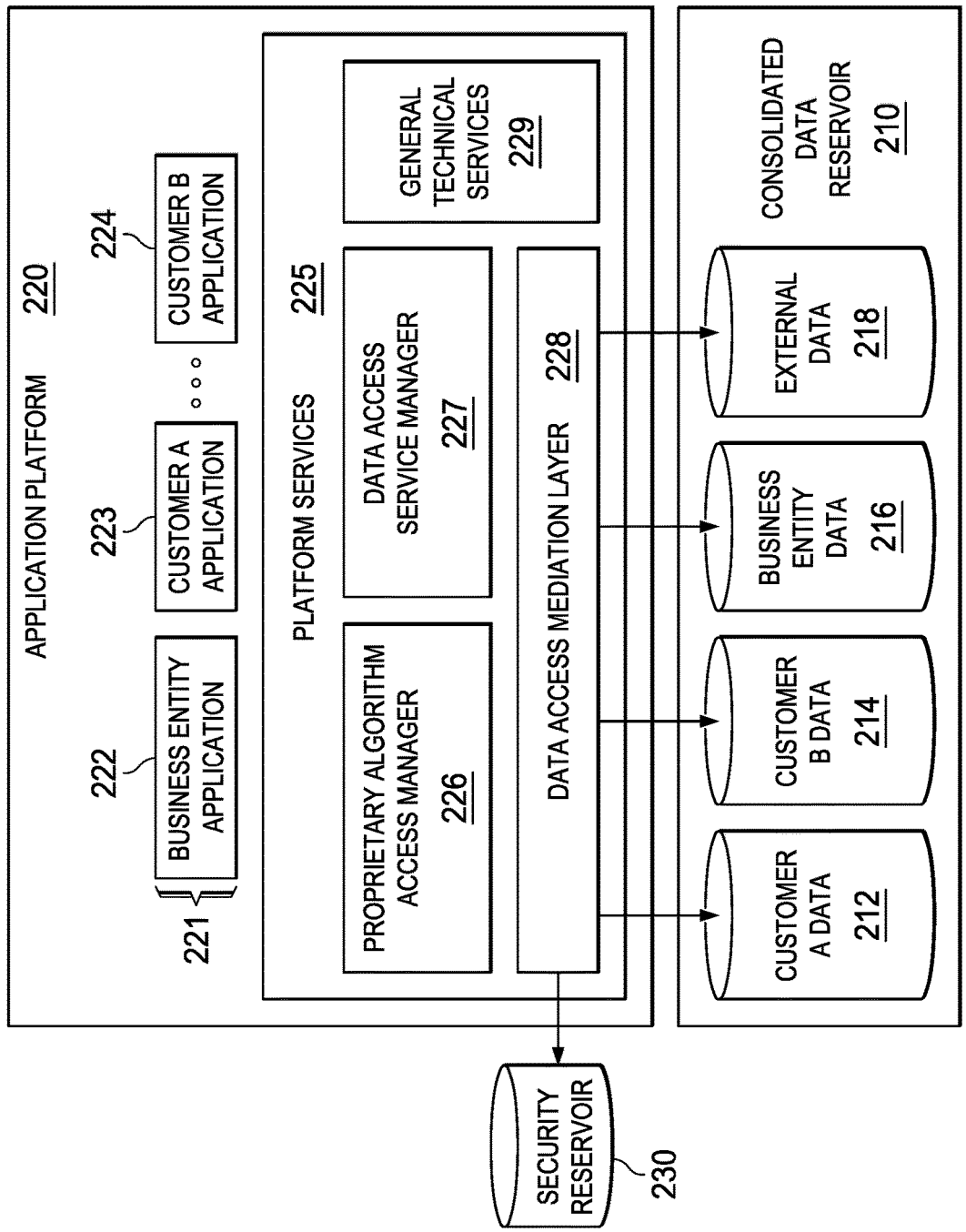
FIG. 2 illustrates a block diagram of a cloud computing platform.

FIG. 2 illustrates a block diagram of a cloud computing platform 200. The cloud computing platform 200 provides a computer infrastructure that allows customers to execute propriety algorithms and access saved data as part of a core set of services. The cloud computing platform 200 leverages the PaaS concept supported by many cloud service providers to allow customers to leverage the assets of the cloud computing platform 200, e.g., data, proprietary algorithms, and computing resources, for the customer's applications. The cloud computing platform 200 includes a consolidated data reservoir 210, an application platform 220, and a security reservoir 230.

Access to the cloud computing platform 200 can be implemented as a pay-per-use model where the assets of the cloud computing platform 200 are tracked as the factors to calculate billing. Thus, customers may perform smaller scale implementations at a higher frequency compared to purchasing use of the assets through negotiated sales. Commodity pricing could also be applied to limited resources of the cloud computing platform 200, such as access to proprietary algorithm implementations. If multiple customers, for example, have short timelines for computational results but the computing resources for the algorithm are limited, the price for those computing resources can be scaled based on demand.

The consolidated data reservoir 210 is computer memory configured to store saved data obtained by a business entity. The saved data includes client data collected by the business entity and business entity data generated by the business entity. Saved data can also include data from an external source or sources, such as represented by external data source 140 in FIG. 1. The consolidated data reservoir 210 can be a Structured Query Language (SQL) system. The consolidated data reservoir 210 can also be a Big Data file system such as Hadoop, or even a NoSQL database such as HBase, Cassandra, etc. In some applications, the consolidated data reservoir 210 can be a combination of various types of data file systems. The consolidated data reservoir 210 can store the saved data such that the data sources are abstracted and a customer can access their data without knowing how or where it is stored.

The consolidated data reservoir 210 can be a single physical location where the saved data is stored in computer memory. In other embodiments, the consolidated data reservoir 210 can be distributed to multiple physical locations of computer memory that are logically connected together. The consolidated data reservoir 210 partitions the saved data to create virtual or physical data stores that allow customer applications to see an appropriately limited view of the saved data. The partitioning can be based on a customer data view to enable customer applications access to customer-specific data. In some embodiments, applications of the business entity may have a view of data covering multiple customers but be limited to the type of data available. Partitioning of the data allows the business entity to present a view of data that is appropriate for the purpose of any given application, either a customer application or an internal application. As an example, the consolidated data reservoir 210 is partitioned into four different virtual data stores for Customer A 212, Customer B 214, business entity data 216, and external data 218.

The application platform 220 includes an application layer 221 and a service layer 225. These layers or at least a portion thereof may be implemented on a processor or processors that are directed by executable programs or sequences of software instructions. The application layer 221 includes an infrastructure for developing and running applications that include an application or applications of a customer or customers of the business entity. The application layer 221 is configured to run business entity and customer applications concurrently but logically isolated from each other. This, in effect, executes each application in a sandbox that prevents it from having visibility into other applications or the underlying resources of the cloud computing platform 200. Each application is deployed by the creator of the application and has access to common platform services of the cloud computing platform 200 provided as part of a scalable infrastructure. In FIG. 2, an internal business entity application 222, Customer A application 223 and Customer B application 224 are illustrated to represent the various customer and business entity applications that can be developed and executed in isolation from each other in the application layer 221. As illustrated in FIG. 2, the application layer 221 can include more customer applications than illustrated. Additionally, the application layer can include more than the single business entity application 222 illustrated in FIG. 2.

The application platform 220 also includes a service layer 225. The service layer 225 includes an infrastructure that provides applications with a set of default supported capabilities that can be utilized by applications running on the application layer 221. The service layer 225 includes a proprietary algorithm access manager 226, data access service manager 227, a data access mediation layer 228, and general technical services 229.

The proprietary algorithm access manager 226 is configured to allow the applications of the application layer 221 to execute the proprietary algorithms employing inputs specified by the applications. For example, Customer A application 223 or Customer B application 224 can execute corporate proprietary algorithms with inputs specified by the respective application running in the application layer 221. Unlike conventional platforms, access to the proprietary algorithms is abstracted in that a customer does not need to know where the proprietary algorithms are stored or how they are explicitly invoked. The customers also do not need to know how to manage the invocation of the proprietary algorithms. For example, if it takes a long time to run an algorithm, the customer does not have to manage the difficult part of waiting for the invocation to complete, handle detecting errors, recovering, etc. Instead, this is a feature of the cloud computing platform 200 for the applications on the application layer 221.

Thus, the proprietary algorithm access manager 226 removes the difficulty of a customer learning to interface with an application program interface (API) for the proprietary algorithms and in some cases learning how to interpret the results. Instead, the proprietary algorithm access manager 226 has an established communication interface, e.g., an API, to allow access to the proprietary algorithms by the applications of the application layer 221. The source of the data inputs for the proprietary algorithms could be from the saved data for which the cloud computing platform 200 provides access via the consolidated data reservoir 210. For example, source of the data inputs can be client data collected by the business entity. The cloud computing platform 200 also allows other data sources to be employed as determined by the author of the application. The general technical services 229 can provide access to other data sources.

The data access service manager 227 provides a view of the saved data in a unified format to the applications of the application layer 221. The view can be a data set resulting from a query of the saved data. The view of the saved data can result in the client data that is collected and stored as the customer does business with the business entity. The data access service manager 227 receives a request for the saved data from the applications and cooperates with the data access mediation layer 228 to provide a view of the data in a unified format to the applications. The view of the data provided by the data access service manager 227 to the applications can be a recognized query result of a SQL database. The request, however, does not have to be an SQL query. For example, the data may not be stored in a SQL database. With the data access service manager 227 and the data access mediation layer 228, the applications do not need to know the type of database. The data access mediation layer 228 can hide this database detail of the consolidated data reservoir 210 from the applications of the application layer 221 application and the data can be presented in an API with a well-known structure, i.e., the unified format.

The unified format is a data structure format defined by the established API in which the data is accessed. The unified format may change depending on the best way to process the data. The unified format can be, for example, in the form of an N-tuple, an array of N-tuples, or a series of flattened N-tuple arrays (i.e., tables) that contain information needed to understand relational significance between subgroups of N-tuples (i.e., similar to a SQL foreign key relationship). Additionally, the unified format can be in the form of an object hierarchy or simple key/value pairs. The unified format can also be a data format defined by an external standards body such as WITSML, Multispeak, etc. Instead of defining a single format, the data access mediation layer 228 provides an API as part of the cloud computing platform 200 that allows the customer to understand how to access the data without knowing specifically how or where it is stored in the consolidated data reservoir 210.

The data access mediation layer 228 is configured to control access to the saved data stored on the consolidated data reservoir 210. The data access mediation layer 228 is responsible for interpretation and transformation of the data that is provided to the applications of the application layer 221 as well as the security aspects. The data access mediation layer 228 uses security information, such as the system configuration data and security metadata, from the security reservoir 230 to present the customer a view of data that is isolated from other customer or corporate data based upon the identity of the running application. Applications of the application layer 221, customer or business entity, can execute against a common format of the data view, but the data contents would change based on the identity of the running application.

For example, the data access mediation layer 228 can use the security information from the security reservoir 230 to limit Customer A application 223 to only access the data of Customer A data 212. Access to the saved data in the consolidated data reservoir 210 would be controlled to prevent Customer A application 223 from accessing the data of another customer, such as data from Customer B data 214. The data access mediation layer 228 may also be configured to permit the business entity application 222 to access Customer A data 212, Customer B data 214, and the business entity data 216. Customer A, Customer B and business entity applications could all access the external data 218. The consolidated data reservoir 210 provides data storage for each customer that is "virtual" in that there is no distinct place for each customer's data. All data is stored consolidated in the consolidated data reservoir 210 but the data access mediation layer 228 can make it appear to a customer application of the application layer 221 that the customer has their own database.

The general technical services 229 are common components of a conventional platform, such as a PaaS, that are utilized to interface with users of the platform or to integrate with data sourced from other systems.

The security reservoir 230 stores identity, resource constraints, application configuration, system configuration data, security metadata, etc., that are defined for the platform. The security reservoir 230 and the security information contained therein are typically controlled by the IT team of the business entity that operates the cloud computing platform 200. The security information is employed to limit use of the cloud computing platform 200 to authorized parties. The security reservoir 230 or at least a part thereof may be implemented on a processor, a computer memory or a combination thereof.

Figure 3:
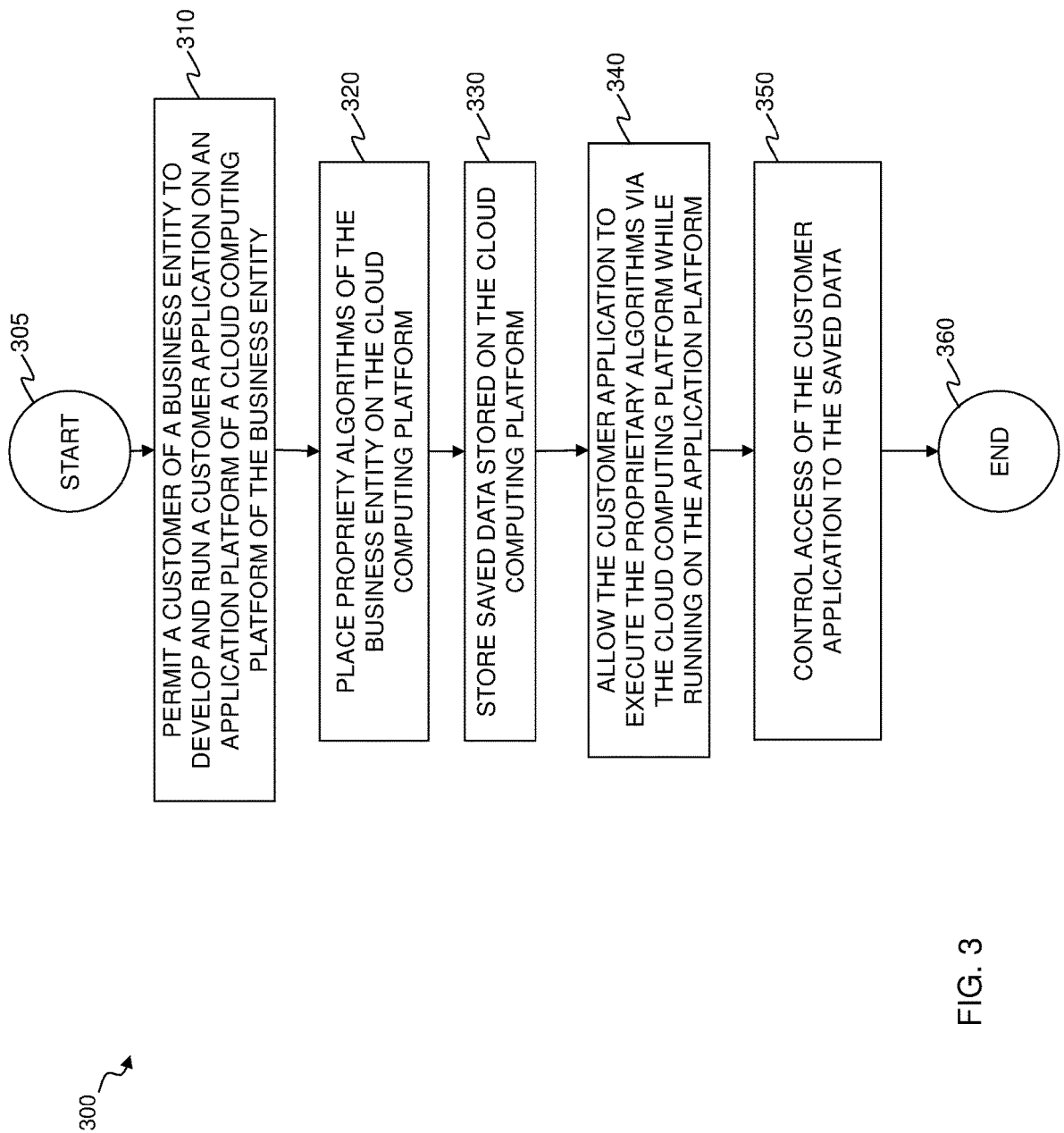
FIG. 3 illustrates a flow diagram of a method of operating a cloud computing platform.

FIG. 3 illustrates a flow diagram of a method 300 of operating a cloud computing platform. The cloud computing platform may be the cloud computing platform 138 of FIG. 1 or the cloud computing platform 200 of FIG. 2. The method 300 begins in a step 305.

In a step 310, a customer of a business entity is permitted to develop and run a customer application on an application platform of a cloud computing platform of the business entity. The customer may develop and run multiple applications on the application platform and more than one customer of the business entity can be allowed access to develop and run their applications. Additionally, the business entity itself can develop and run applications on the application platform. As such, the application platform is a scalable platform for developing applications. Each of the applications, customer and business entity, of the application platform can be executed and developed in isolation from the other applications. The cloud computing platform can be a private platform of the business entity.

Propriety algorithms of the business entity are placed on the cloud computing platform in a step 320. The proprietary algorithms can be implemented as software or computer programs that aid the business entity in planning, executing, and analyzing jobs. The proprietary algorithms can be saved or stored in a designated memory of a cloud computing platform, such as the cloud computing platform 138 or the cloud computing platform 200 disclosed herein.

In a step 330, saved data is stored on the cloud computing platform. The saved data includes client data that is generated by the business entity when performing a job for the customer. In addition, the saved data can include other client data from other customers of the business entity, data from the business entity itself, and data from external source (external source data).

In a step 340, the customer application is allowed to execute proprietary algorithms via the cloud computing platform while running on the application platform. The customer application, therefore, can deploy and execute code as a self-service activity with well-defined security boundaries. The cloud computing platform allows the customer application to execute the proprietary algorithms without compiling the proprietary algorithms. Thus, the code to execute the proprietary algorithms is hidden from the customer application.

Access of the customer application to the saved data is controlled in a step 350. The method 300 includes access to proprietary algorithms and saved data as part of the core set of platform services of the cloud computing platform. Controlling access to the saved data may include partitioning the saved data according to the customer application or applications. Controlling the access to the saved data can also include presenting the saved data to the customer application in a unified format. The cloud computing platform provides access to the saved data without an intervening external or public network between the customer application and the saved data. Thus, the customer application is not required to access a network external to the business entity network once the customer application is running on the cloud computing platform. The cloud computing platform allows close proximity between the application, the proprietary algorithms and the saved data that results in improved integration. The method 300 ends in a step 360.

Figure 4:
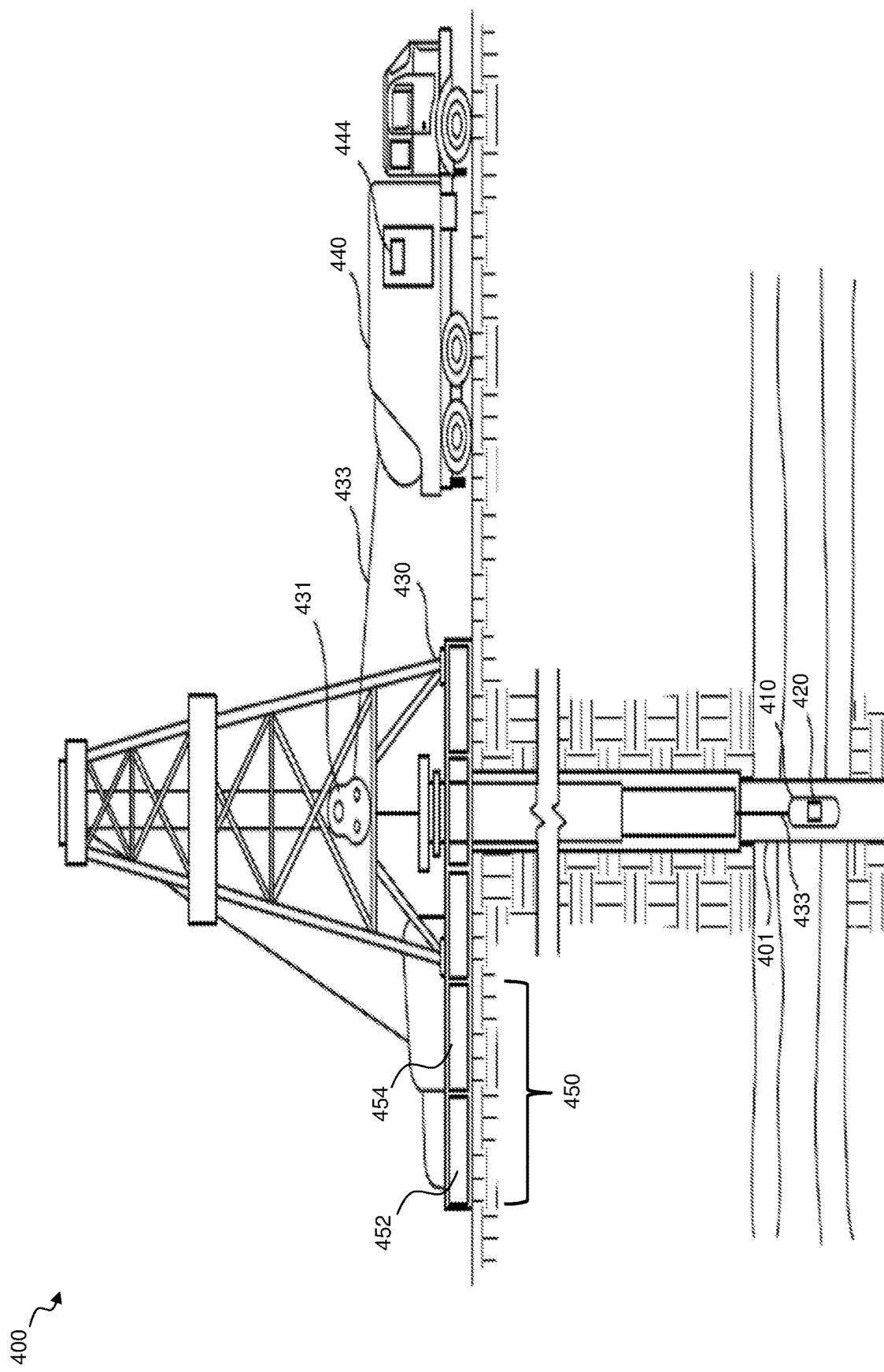
FIG. 4 illustrates a wireline system configured to perform formation testing and sampling.

FIG. 4 illustrates a wireline system 400 configured to perform formation testing and sampling. After drilling of a wellbore 501 is complete, it may be desirable to know more details of types of formation fluids and the associated characteristics through sampling with use of a wireline formation tester. A business entity may operate the wireline system 400 for a customer. The business entity can collect client data from the testing and sampling for the customer and store the client data in a consolidated data reservoir of a cloud computing platform. For example, the client data can be stored in the consolidated data reservoir 210. The client data can then be processed by the customer and the business entity using a cloud computing platform such as disclosed herein. The cloud computing platform advantageously allows a customer to process the client data for a particular job along with all client data from the complete set of historical jobs performed for the customer.

Wireline system 400 may include a wireline tool 410 that forms part of a wireline logging operation that can include an NMR transceiver 420 as part of a downhole measurement tool. Wireline system 400 may include a derrick 430 that supports a traveling block 431, and the wireline tool 410, such as a probe or a sonde, may be lowered by wireline or logging cable 433 into a borehole 401. The wireline tool 410 may be lowered to the bottom of the region of interest and subsequently pulled upward at a substantially constant speed. The wireline tool 410 may be configured to measure fluid properties of the wellbore fluids, and any measurement data generated by wireline tool 410 and the one or more NMR transceiver 420 can be communicated to a surface logging facility 440 for storage, processing, and/or analysis. In some embodiments, the wireline tool 410 is configured to measure properties of a substrate surrounding borehole 401, as disclosed herein.

Logging facility 440 may be provided with electronic equipment 444, including processors for various types of signal processing. Wireline system 400 may further include a controller 450 having a processor 452 and a memory 454. The client data generated via a job may be stored in the memory 454 and then sent to a consolidated data reservoir via a communications network.

Figure 5:
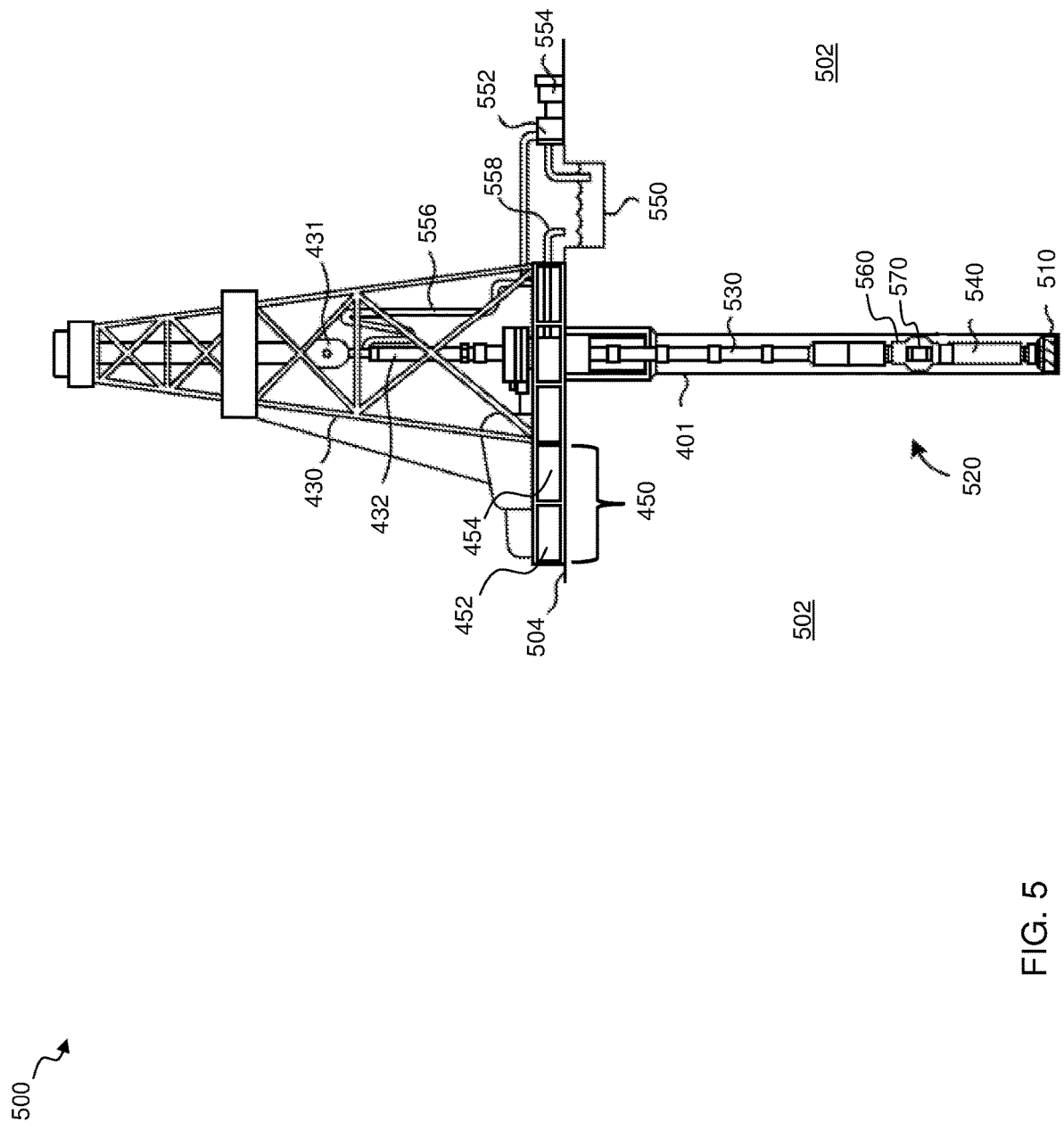
FIG. 5 illustrates a logging while drilling (LWD) system configured to perform formation drilling.

FIG. 5 illustrates a logging while drilling (LWD) system 500 configured to perform formation drilling. The formation drilling may be performed by a business entity for a customer. The business entity can collect client data from the formation drilling for the customer and store the client data in a consolidated data reservoir of a cloud computing platform. For example, the client data can be stored in the consolidated data reservoir 210. The client data can then be processed by the customer and the business entity using a cloud computing platform such as disclosed herein. Borehole 401 may be created by drilling into the earth 502 using a drilling tool. LWD system 500 may be configured to drive bottom hole assembly (BHA) 520 positioned or otherwise arranged at the bottom of a drill string 530 extended into the earth 502 from derrick 430 arranged at the surface 504. Derrick 430 includes a kelly 432 and a traveling block 431 used to lower and raise the kelly 432 and drill string 530.

BHA 520 may include a drill tool 510 operatively coupled to a tool string 540 which may be moved axially within wellbore 401 as attached to the tool string 540. During operation, drill tool 510 penetrates the earth 502 and thereby creates wellbore 401. BHA 520 provides directional control of drill tool 510 as it advances into earth 502. Tool string 540 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within drill string 530.

Fluid or "drilling mud" from a mud tank 550 may be pumped downhole using a mud pump 552 powered by an adjacent power source, such as a prime mover or motor 554. The drilling mud may be pumped from mud tank 550, through a stand pipe 556, which feeds the drilling mud into drill string 530 and conveys the same to drill tool 510. The drilling mud exits one or more nozzles arranged in drill tool 510 and in the process cools drill tool 510. After exiting drill tool 510, the mud circulates back to the surface 504 via the annulus defined between the wellbore 401 and the drill string 530, and in the process, returns drill cuttings and debris to the surface. The cuttings and mud mixture are passed through a flow line 558 and are processed such that a cleaned mud is returned down hole through the stand pipe 556 once again. BHA 520 may further include an LWD tool 560. LWD tool 560 may include a sensor that incorporates the use of a NMR transceiver 570. LWD tool 560 may be positioned between drill string 530 and drill tool 510.

A controller 450 including a processor 452 and a memory 454 is communicatively coupled to NMR transceiver 570 in LWD tool 560. While NMR transceiver 570 may be placed at the bottom of wellbore 401, and extend for a few inches, a communication channel may be established by using electrical signals or mud pulse telemetry for most of the length of tool string 530 from drill tool 510 to controller 450. Memory 454 can store the client data collected by the business entity for the customer. For example, in some embodiments, controller 450 may receive information from NMR transceiver 570 about drilling conditions in wellbore 401 and controller 450 may provide a command to BHA 520 to modify certain drilling parameters. For example, controller 450 may provide a command to adjust or change the drilling direction of drill tool 510 based on a message contained in information provided by NMR transceiver 570. In that regard, the information provided by NMR transceiver 570 to controller 450 may include certain drilling conditions such as physical or chemical properties of the drilling mud in the subterranean environment.

Accordingly, controller 450 may use processor 452 to determine a characteristic of the sample in a medium surrounding drill tool 510 using the data collected from NMR transceiver 570. The determined characteristic is an example of client data collected by the business entity. Other client data can include the commands, readings, and responses. Wireline tool 410 and LWD tool 560 may be referred to as a downhole tool.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described systems and methods or at least a portion thereof may be embodied in or performed by various processors, such as digital data processors or computers, wherein the computers are programmed or store executable programs or sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein may further relate to computer storage products with a non-transitory computer-readable medium that have program code thereon for performing various computer-implemented operations that embody at least part of the apparatuses, the systems or carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

Embodiments disclosed herein include:

A. A cloud computing platform of a business entity, including a consolidated data reservoir configured to store saved data collected by a business entity, an application layer having an infrastructure for developing and running applications, including at least one customer application of a customer of the business entity, and a service layer configured to control access of the customer application to the saved data and allow the customer application to execute proprietary algorithms of the business entity.

B. A method of operating a cloud computing platform including permitting a customer of a business entity to develop and run a customer application on an application platform of a cloud computing platform of the business entity, placing propriety algorithms of the business entity on the cloud computing platform, and allowing the customer application to execute the proprietary algorithms via the cloud computing platform while running on the application platform.

C. A private business entity network including a firewall configured to provide a barrier between the private business entity network and a communications network coupled thereto, and a cloud computing platform, coupled to the firewall, including a computing infrastructure having proprietary algorithms and saved data of a business entity and configured to allow customers of the business entity to develop and run their own customer applications that access the saved data and execute the proprietary algorithms.

Each of embodiments A, B, and C may have one or more of the following additional elements in combination: Element 1: wherein the applications include entity applications of the business entity and multiple customer applications from different customers of the business entity. Element 2: wherein the application layer is configured to logically isolate the applications executing in the application layer. Element 3: wherein the service layer includes a proprietary algorithm access manager configured to allow the customer application to execute the proprietary algorithms employing inputs specified by the customer application. Element 4: wherein the service layer includes a data access service manager configured to provide a view of the saved data in a unified format to the customer application. Element 5: wherein the service layer includes a data access mediation layer manager configured to control access to the saved data. Element 6: a security reservoir, wherein the data access mediation layer employs security information from the security reservoir to control access to the saved data. Element 7: wherein the allowing includes allowing the customer application to execute the proprietary algorithms without compiling the proprietary algorithms. Element 8: storing saved data on the cloud computing platform. Element 9: controlling access of the customer application to the saved data. Element 10: wherein the controlling includes partitioning the saved data according to the customer application. Element 11: wherein the controlling access includes presenting the saved data to the customer application in a unified format. Element 12: wherein the saved data includes client data that is generated by the business entity when performing a job for the customer. Element 13: wherein the saved data includes the client data, other client data from other customers of the business entity, business entity data, and external source data. Element 14: wherein the cloud computing platform is configured to allow the customer applications to execute the proprietary algorithms without compiling the proprietary algorithms. Element 15: wherein the cloud computing platform is configured to control access to the saved data according to the customers. Element 16: wherein the cloud computing platform is configured to partition the saved data according to the customers. Element 17: wherein cloud computing platform is configured to logically isolate each of the customer applications from other ones of the customer applications.

What is claimed is:

1. A cloud computing platform of a business entity, comprising:
   a memory including a consolidated data reservoir configured to store saved data collected by a business entity in virtual data stores, wherein said saved data includes client data from different customers that was collected by said business entity when performing at least one job for said different customers associated with a wellsite of said different customers, wherein said client data of each of said different customers is partitioned into a different one of said virtual data stores;

a processor including an application layer having an infrastructure for developing and running applications, including at least one customer application of one of said different customers of said business entity and an entity application of said business entity; and a processor including a service layer configured to limit access of said customer application to said client data that is stored in said different one of said data stores of said one of said different customers, allow access of said entity application to all of said client data stored in each of said different data stores, and allow said customer application to execute proprietary algorithms of said business entity.

2. The cloud computing platform as recited in claim 1 wherein said applications include multiple entity applications and multiple customer applications from said different customers.

3. The cloud computing platform as recited in claim 2 wherein said application layer is configured to logically isolate said multiple customer applications executing in said application layer.

4. The cloud computing platform as recited in claim 1, wherein said service layer includes a proprietary algorithm access manager configured to allow said customer application to execute said proprietary algorithms employing inputs specified by said customer application.

5. The cloud computing platform as recited in claim 1, wherein said service layer includes a data access service manager configured to provide a view of said saved data in a unified format to said customer application.

6. The cloud computing platform as recited in claim 1, wherein said service layer includes a data access mediation layer manager configured to control access to said saved data via a unified format that is defined by an application program interface.

7. The cloud computing platform as recited in claim 6, wherein said application program interface changes said unified format changes based on processing of data accessed from said saved data.

8. A method of operating a cloud computing platform, comprising:

storing client data of customers of a business entity that was collected by said business entity when performing a job for said customers at an associated wellsite, wherein said storing includes partitioning said client data from each of said customers into different data stores;

permitting said customers to develop and run a customer applications on an application platform of a cloud computing platform of said business entity, wherein said application platform includes at least one entity application of said business entity;

placing propriety algorithms of said business entity on said cloud computing platform;

allowing said customer applications to execute said proprietary algorithms via said cloud computing platform while running on said application platform; and controlling access of said customer applications and said entity application to said client data using said different data stores and an identity of said customer application and said entity application.

9. The method as recited in claim 8 wherein said allowing includes allowing said customer application to execute said proprietary algorithms without compiling said proprietary algorithms.

10. The method as recited in claim 8, wherein said customers are competitors in the energy industry.

11. The method as recited in claim 10, wherein said different data stores are virtual data stores.

12. The method as recited in claim 11, further comprising storing business entity data and external source data, wherein controlling access includes allowing said customer applications access to said external source data, limiting said customer applications access to said business entity data, and allowing said entity application access to both said external source data and said business entity data.

13. The method as recited in claim 8, wherein said controlling access includes limiting access of each of said customer applications of a different one of said customers to said client data that is stored in said different data stores of said different one of said different customers.

14. The method as recited in claim 13 wherein said controlling access includes using a common data format for presenting said saved data to said customer applications and said entity application.

15. The method as recited in claim 8 wherein said controlling access includes allowing access of said entity application to said client data in each of said different data stores.

16. A private business entity network, comprising:

a firewall processor including a firewall configured to provide a barrier between said private business entity network and a communications network coupled thereto; and a cloud computing platform, coupled to said firewall, including a memory having proprietary algorithms and saved data of a business entity and an application processor configured to allow different customers of said business entity to develop and run their own customer applications that access said saved data and execute said proprietary algorithms, wherein said saved data includes client data for each of said different customers that is partitioned into different virtual data stores associated with said different customers, wherein said client data is from at least one job performed by said business entity for said different customers at a wellsite thereof, said application processor further configured to limit access of said customer applications to said client data that is stored in their own virtual data store and allow access of said entity application to all of said saved data.

17. The private business entity network as recited in claim 16 wherein said cloud computing platform is configured to allow said customer applications to execute said proprietary algorithms without compiling said proprietary algorithms.

18. The private business entity network as recited in claim 16, wherein said client data is collected by and stored by said business entity in said memory.

19. The private business entity network as recited in claim 16, wherein said cloud computing platform is configured to allow execution of each of said customer applications behind said firewall and proximate to said client data stored in their own virtual data store.

20. The private business entity network as recited in claim 16, wherein cloud computing platform is configured to logically isolate each of said customer applications from other ones of said customer applications.

* * * * *